Aug. 14, 1956
R. H. AWE
2,758,532
VENTILATED BACK REST FOR A VEHICLE SEAT
Filed Aug. 21, 1952
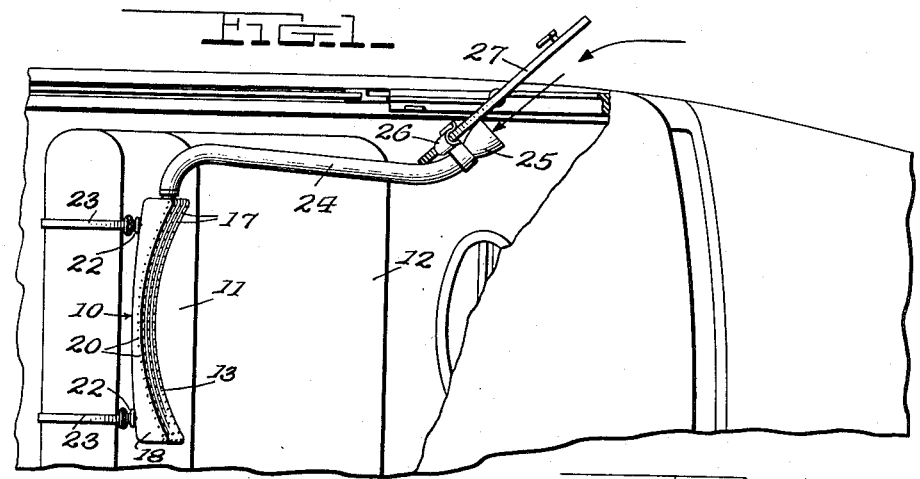
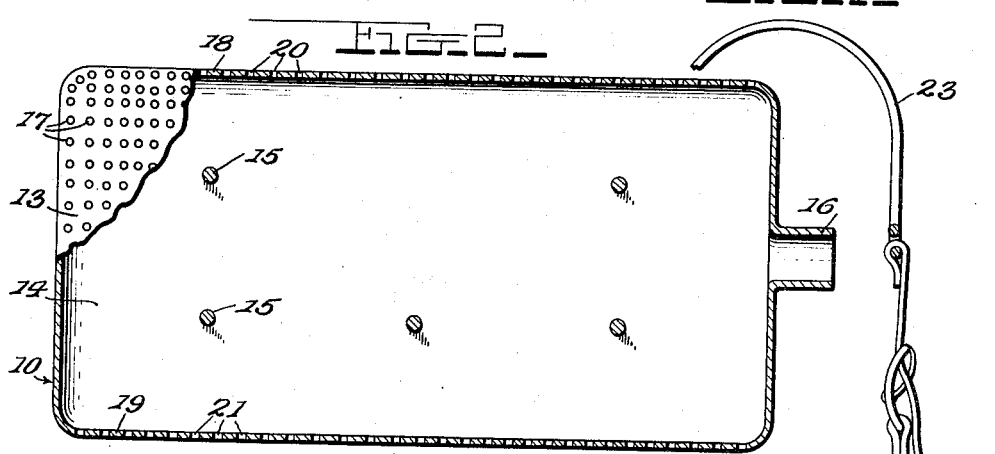
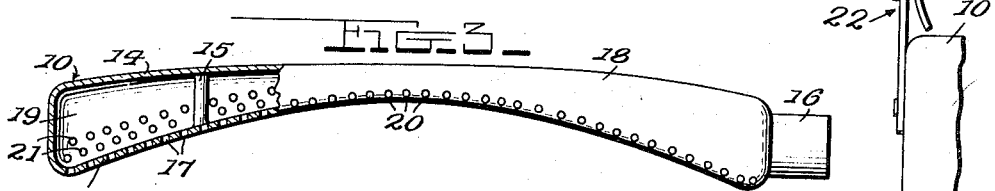
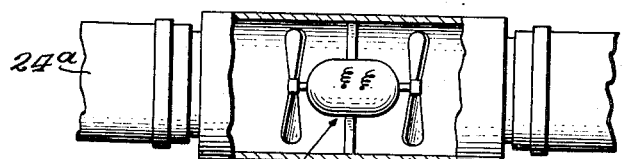
INVENTOR.
R. H. Awe
BY Roy A. Plant
atty.

United States Patent Office 2,758,532
Patented Aug. 14, 1956

2,758,532

VENTILATED BACK REST FOR A VEHICLE SEAT

Raymond H. Awe, Battle Creek, Mich.

Application August 21, 1952, Serial No. 305,639

3 Claims. (Cl. 98—2)

This invention relates broadly to a ventilating method and apparatus, and in its specific phases to certain new and useful improvements in cooling methods and air operated devices adapted for use in cooling the back of an automobile driver and/or other automobile passengers.

When driving an automobile in hot weather the driver's back becomes uncomfortably hot and usually perspires prolifically to his further discomfort. The desirability of preventing this has for years been recognized and has led to numerous attempts at devising satisfactory cooling means, such as piping air into the portion of the seat containing the coil springs and letting it seep out wherever it can, or even building pipes into the seat cushion and back. Such attempts, however, have heretofore resulted only in more or less expensive, impractical, and unsuccessful devices which have accomplished little more than to accentuate the desirability instead of fulfilling the need. It was a recognition of this problem and the complete lack of any satisfactory apparatus of this type on the market which led to the conception and development of the present invention.

The present invention aims to fulfill all requirements for a back cooling device by providing a readily usable, simple, inexpensive, and practical construction.

In carrying out the above end, another object of the invention is to provide a comfortable back rest for the driver, said back rest having a myriad of air discharge openings adjacent the driver's back under conditions of use.

A further object of the invention is to provide novel means for supplying air under pressure into the back rest and for maintaining the air pressure above atmospheric in said back rest, whereby the air must expand as it discharges through the air escape openings and such expansion will cause a drop in air temperature.

Another object of the invention is to provide a novel construction including an air conducting hose extending to the hollow back rest and having an air admission end into which outside air is scooped by the usual window wing at the driver's side of the car.

Still another object of the invention is to make novel provision for connecting the air conducting hose with the ventilating wing in such position that positioned adjustment of said wing to scoop more or less air into the car will cause said wing to direct correspondingly more or less air into said hose.

Still another object is to provide means for forced delivery of air through the hose even though the automobile is standing still.

A still further object of the invention is to make novel provision for so mounting the device that it may be quickly and easily attached when its use is required and vice versa.

Still further objects and advantages of the present invention will appear as the description proceeds.

To the accomplishment of the foregoing and related ends, the invention, then, consists of the cooling and ventilating methods and means hereinafter fully described and particularly pointed out in the claims, the annexed drawing and the following description setting forth in detail certain means and one mode of carrying out the invention, such disclosed means and mode illustrating, however, but one of the various ways in which the principle of the invention may be used.

In the annexed drawing:

Figure 1 is a diagrammatic fragmentary top plan view partly broken away and in section, showing the invention operatively applied.

Figure 2 is an enlarged view partly in front elevation but primarily in section, showing the back rest of the present invention.

Figure 3 is an enlarged upper edge view of the back rest, partly in section.

Figure 4 is a fragmentary end view, partly in section, showing a preferred means for connecting the back rest with the back of the driver's seat.

Figure 5 is a fragmentary elevation, partly in section, showing a fan which may be employed if desired to force the air into the back rest.

The construction shown in the drawing will be rather specifically described in terms of use by the automobile driver, but attention is invited to use of the invention by others than the driver and the possibility of making numerous variations within the scope of the invention as claimed.

A hollow rigid or semi-rigid back rest 10 is shown to lie against the seat back 11 of a driver's seat 12. This back rest 10 is relatively shallow from front to rear, is preferably of generally rectangular form as viewed from the front, and is longitudinally curved as viewed from above for comfort of the user. All corners are also rounded in preferred construction to prevent discomfort to the user and injury to the upholstery. Metal or plastic may be satisfactorily used in the manufacture of this back rest and it is preferable to connect, or at least support, its front wall 13 with its back wall 14 by means of small posts 15 for reinforcing purposes.

One end of the back rest 10 is provided with an air inlet nipple 16, and the front wall 13 is formed with a myriad of air escape perforations 17. Also, the top 18 and bottom 19 are perforated at 20 and 21, respectively, to discharge some air upwardly adjacent the driver's shoulders and some air downwardly to the seating portion of seat 12. There are preferably more perforations 21 than 20 since more heat tends to be pocketed near the junction of the seat back 11 and the seating portion of seat 12, and this construction facilitates flushing away such heat.

For suspending the back rest 10, adjustable straps 22 having hooks 23 at their upper ends, have been shown, said hooks being adapted to engage the upper edge of the seat back 11 and be supported by same. These straps may be of firm construction, or, if desired they can be made somewhat elastic so as to stretch and retract as the driver moves up and down slightly in response to jolts transmitted from the road over which the automobile is being driven.

An air conduit in the form of a flexible hose 24 is suitably connected at one end with the nipple 16 of back rest 10 and at its other end it is provided with an air inlet funnel 25. This funnel is provided at its side with an arched mounting spring clip 26 substantially as shown in Figure 1. The sides of funnel 25 are preferably flattened to provide for efficient reception of the rapidly flowing air passing along the face of wing 27. This funnel is disposed at the front side of the usual ventilating wing 27 of the car when said wing is swung to a position in which it will inwardly scoop outside air, and the clip 26 is then engaged with the edge of said wing, preferably as seen in the drawing. Thus, the wing 27 directs a forcible blast of air into the funnel 25 and through the hose 24 into the hollow back rest 10. This hose and the connections for same are preferably free from sharp turns since sharp turns increase air friction and reduce the efficiency of the apparatus by lessening the amount of air flowing through the back rest. The air is thus supplied to the back rest at such a rate that it is maintained in a compressed state in said back rest while some of this compressed air continuously discharges through the various perforations to cool the driver's back. The cooling effect is greatly augmented by the rapid expansion of the air as it leaves the perforations, since it utilizes the cooling principle embodied in mechanical refrigeration, wherein expanding gaseous fluids take up heat, and thereby provides for unusually effective cooling.

If desired, the air may be supplied under pressure to the back rest 10 by means of an electric fan. Such a fan has been shown at 28 in Figure 5, and is preferably mounted within a casing 29 embodied in the air conducting hose or other conduit 24a.

From the foregoing, it will be seen that novel and advantageous provision has been disclosed for attaining the desired ends, but attention is again invited to the possibility of making numerous variations within the scope of the invention claimed. Hose 24, for instance, instead of carrying cooling air is just as capable of carrying flowing hot air to provide warmth for the driver and it is intended that the showing in the drawing be considered to also diagrammatically illustrate such construction since it is merely a matter of choice as to what source of flowing air the user decides to point funnel 25 and that does not change the present invention. Moreover, it will be clear that the mere positioning of the invention to cool an accupant other than the driver, would fall well within the scope of the present invention.

Other modes of applying the principle of my invention may be employed instead of the one explained, change being made as regards the cooling and ventilating means and method herein disclosed, provided those stated by any of the following claims or their equivalent be employed.

I therefore point out and distinctly claim as my invention:

1. In combination with an automobile having a ventilating wing near a seat thereof, said wing being swingable to a position in which it will inwardly scoop outside air; an occupant-cooling member mounted on the forward upright face of said seat so that in normal riding position an occupant can have his back rest against the forward side of said occupant-cooling member which has an air inlet means, said occupant-cooling member being semi-rigid with its front face concave-curved to receive and support the back of the occupant using it, the ends of said front face portion extending back and terminating in supporting means in contact with the forward upright face of said seat, said ends and supporting means also being of semi-rigid construction, said occupant-cooling member having a discharge portion at least in said concave-curved front face, an air conducting conduit having one of its ends connected to said air inlet means, the other end of said conduit being open for air reception, and means mounting said open end of said conduit at the front side of said wing in position to receive some of the inwardly scooped air while said wing is swung to said air scooping position, wherein said occupant-cooling member also has an upper and a lower air discharge portion in addition to the air discharge portion in its concave-curved front face.

2. In combination with an automobile having a ventilating wing near a seat thereof, said wing being swingable to a position in which it will inwardly scoop outside air; an occupant-cooling member mounted on the forward upright face of said seat so that in normal riding position an occupant can have his back rest against the forward side of said occupant-cooling member which has an air inlet means, said occupant-cooling member being semi-rigid with its front face concave-curved to receive and support the back of the occupant using it, the ends of said front face portion extending back and terminating in supporting means in contact with the forward upright face of said seat, said ends and supporting means also being of semi-rigid construction, said occupant-cooling member having a discharge portion at least in said concave-curved front face, an air conducting conduit having one of its ends connected to said air inlet means, the other end of said conduit being open for air reception, and means mounting said open end of said conduit at the front side of said wing in position to receive some of the inwardly scooped air while said wing is swung to said air scooping position, wherein said conduit is flexible, and said occupant-cooling member also has an upper and a lower air discharge portion in addition to the air discharge portion in its concave-curved front face.

3. A portable accessory for the relief of motorists in hot weather comprising a semi-rigid back-conforming back rest for insertion behind a motorist's back against a conventionally cushioned seat back, having only enough rigidity in support portions to maintain a substantially continuous air space between its edges, its face and the back cushion, said back rest having an air inlet in one edge and a multiplicity of air outlets in said face, a flexible conduit connected to said air inlet and having means at its free end for clipping said end to an open window or other car portion in an air stream for scooping air into it, wherein the upper and lower edges are also provided with air outlets, the upper edge having relatively fewer outlets.

References Cited in the file of this patent

UNITED STATES PATENTS

| | | |
|---|---|---|
| 910,023 | Smith | Jan. 19, 1909 |
| 1,439,681 | Alkire et al. | Dec. 26, 1922 |
| 1,475,912 | Williams | Nov. 27, 1923 |
| 1,777,982 | Popp | Oct. 7, 1930 |
| 2,022,959 | Gordon | Dec. 3, 1935 |
| 2,158,801 | Petterson | May 16, 1939 |
| 2,528,412 | Bickler | Oct. 31, 1950 |